United States Patent [19]

Hawkins

[11] 4,012,581

[45] Mar. 15, 1977

[54] FRAME-TYPE DAMPING SPACER

[75] Inventor: Ronald G. Hawkins, Massena, N.Y.

[73] Assignee: Aluminum Company of America, Pittsburgh, Pa.

[22] Filed: Mar. 5, 1976

[21] Appl. No.: 664,087

[52] U.S. Cl. .................................. 174/42; 174/146
[51] Int. Cl.² ...................... H02G 7/14; H02G 7/12
[58] Field of Search ............................ 174/42, 146

[56] References Cited

UNITED STATES PATENTS

| | | | |
|---|---|---|---|
| 3,474,184 | 10/1969 | Crosby et al. | 174/42 |
| 3,617,609 | 11/1971 | Tuttle | 174/42 |
| 3,777,047 | 12/1973 | Rawlins | 174/42 |
| 3,870,815 | 3/1975 | Hawkins | 174/42 |

Primary Examiner—Laramie E. Askin
Attorney, Agent, or Firm—Elroy Strickland

[57] ABSTRACT

A damping spacer for overhead conductors, the damping spacer comprising a body member and at least two members for clamping to the overhead conductors. The clamping members are pivotally attached to the body member at two spaced apart locations thereon and on opposed sides of the body member, and a resilient damping means resiliently connects the clamping members to each other without the use of a bolt or pin, the damping means having a longitudinal axis that extends perpendicularly to and through the body member.

17 Claims, 11 Drawing Figures

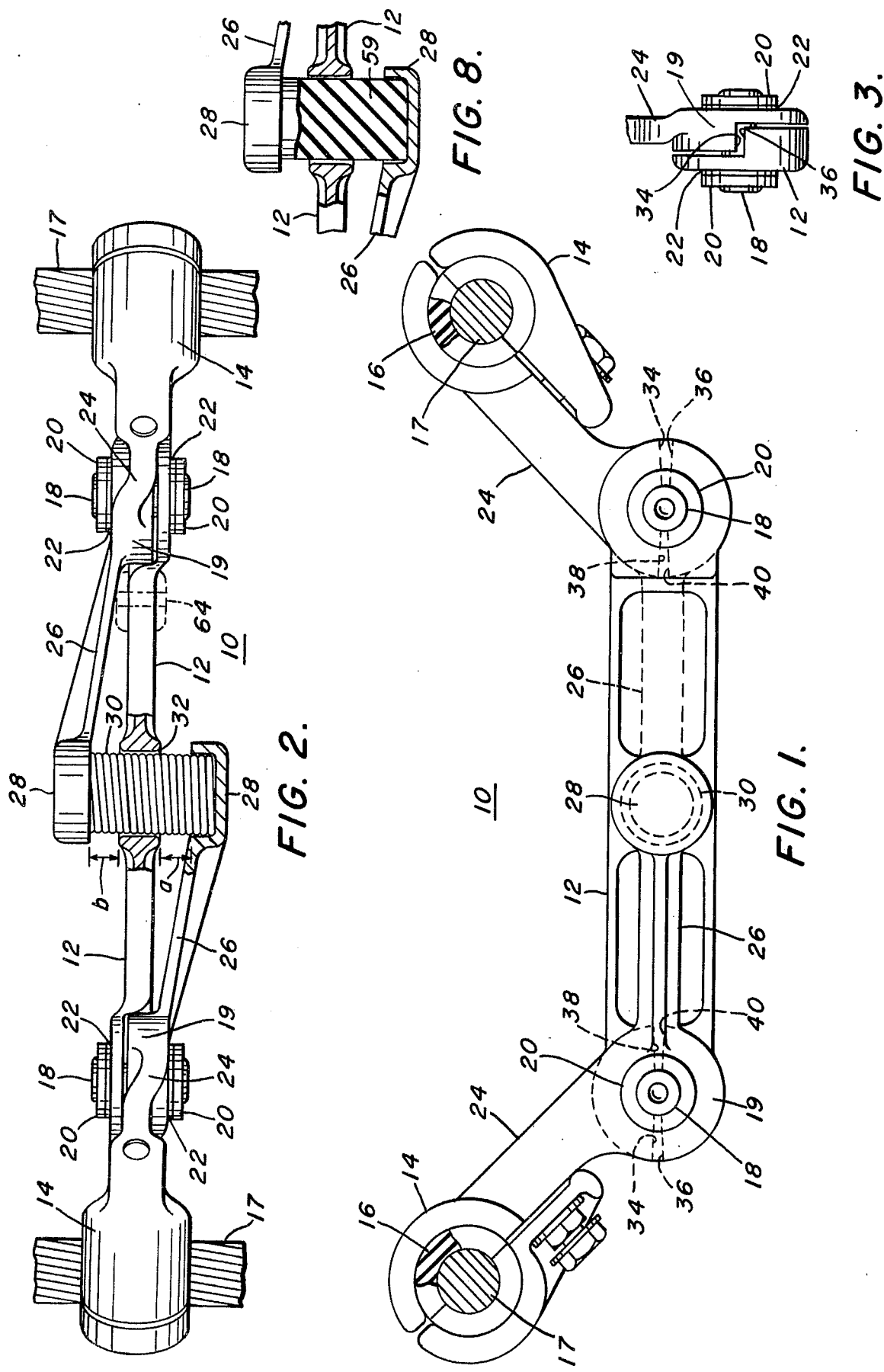

FRAME-TYPE DAMPING SPACER

BACKGROUND OF THE INVENTION

The present invention relates generally to damping spacers for overhead conductor bundles, and to a damping spacer particularly suitable for spacing and damping two conductor bundles, though the principles involved are also applicable to spacing and damping other bundle configurations including four conductor bundles having a diamond shape configuration in cross section.

The damping of the conductors of two conductor bundles by damping spacer devices is somewhat problematic in that two conductor damping spacers are often relatively light in weight such that the motion of a vibrating conductor will tend to simply vibrate the whole damping spacer without producing the relative motion between the components of the spacer that is required to work a damping means mechanically associated with the moving components. It can be appreciated that if a vibrating conductor simply sets in motion the whole damping spacer, or if the two conductors vibrate in unison (in phase and amplitude), without producing effective relative movement of the spacer components designed to operate the damping mechanism, the damping mechanism will not serve its intended purpose.

BRIEF SUMMARY OF THE INVENTION

The present invention is directed to a damping spacer that overcomes the inertial problems that have been generally associated with light weight, two conductor bundle, damping spacers to provide effective damping while simultaneously providing a damping spacer that is easy to manufacture and has a minimum of low cost components. More particularly, the damping spacer of the invention comprises a single bar or body member, two conductor clamp arms (for a two conductor bundle), and two, rigid means pivotally connecting the clamp arms to the bar member at two spaced apart locations on the bar member and on opposed sides of the bar member. A resilient damping means is located intermediate the ends of the bar member and has a longitudinal axis that extends perpendicularly through the bar member. The clamp arms each have an arm portion that extends to and engages the end of the damping means on its side of the bar member, the damping means resiliently connecting the arm portions together, without the use of a rigid fastening means, such as a bolt or pin. When one or both of the conductors vibrates, the motion of vibration is assumed by the clamp arm attached to the conductor, the clamp arm pivoting about its associated pivot means to translate the arm portion engaging the end of the damping means associated with the arm portion. The mass or weight of the bar or frame member is generally such that inertia is provided that is sufficient to cause relative movement of the clamp arm and the bar member. Such relative movement functions to work the damping means, which dissipates the energy of conductor vibration in the form of heat. If the bundle in which the damper of the invention is attached tends to be unstable, i.e., if both conductors of the bundle tend to vibrate in unison, a weight of suitable size and mass may be attached to one end of the frame, closely adjacent one of the rigid pivot means, to stabilize the conductor, and its associated clamp arm, associated with, i.e., closest to, the mass. In this manner, the clamp arm of the damper attached to the other (vibrating) conductor now works against the more stable conductor and clamp arm to effect mechanical working of the damping means to dampen the vibration of the conductor.

THE DRAWINGS

The advantages and objectives of the invention will become more apparent from the following detailed description when considered in connection with the accompanying drawings in which:

FIG. 1 is a side elevation view of a damping spacer for a bundle of two conductors constructed in accordance with the principles of the invention;

FIG. 2 is a plan and partial section view of the damping spacer of FIG. 1;

FIG. 3 is a partial end elevation view of the structure of FIGS. 1 and 2;

FIG. 8 is a sectional view of another damping mechanism employable in the present invention;

PREFERRED EMBODIMENTS

Figure 11:
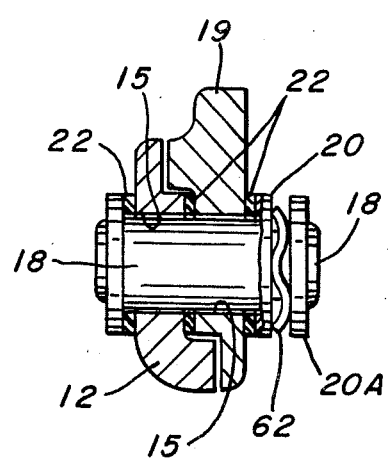
FIG. 11 is a partial end elevation view of the spacer of the invention in which a wave washer is employed.

Referring now to the drawings, FIGS. 1 and 2 show a damping spacer 10 comprised of center bar member 12 and two clamping members 14 pivotally connected to the bar member adjacent opposed ends and on opposed sides thereof by respective rigid pins 18. Pins 18 extend through a hub portion 19 of the clamping members, only the end portions of the pins being visible in FIGS. 1 and 2. In FIG. 11 pin accommodating openings 15 in the bar and one clamp arm are visible. The diameters of the openings and the diameter of each pin are such that damping spacer 10 of the invention is protected from articulation stresses that occur when one conductor of a bundle moves longitudinally and relatively to another conductor of the bundle. Such stresses are preferably absorbed by relatively thick bushings 16 located in clamping members 14, and thus between the clamping members and their respective conductors 17 (in FIG. 1) when the damping spacer is installed in a bundle of conductors.

Preferably the ends of pins 18 are riveted over metal washers 20, with washers 22 (FIG. 2), made of a friction, heat generating material, being located between the metal washers and the sides of bar and clamping members. A similar friction washer (FIG. 11) may be located between the bar and each hub portion 19.

The clamping members 14 each have two integral arm portions 24 and 26 extending outwardly from hub portion 19, and preferably at an obtuse angle to each other about the hub portion. Thus, as seen in FIG. 1, with arm portions 26 located in substantial alignment with bar 12, arm portions 24 extend away from bar 12 at an obtuse angle. Further, arm portions 26 of the clamps extend from respective hubs 19 of the clamps to a location adjacent the longitudinal center of bar 12, and angle outwardly or laterally (FIG. 2) from the plane of the bar to the respective ends of a close coil spring 30.

The end of each arm portion 26 adjacent spring 30 terminates in an inwardly facing cup 28 adapted to receive and seat one end of the spring, the spring extending perpendicular to the axis of the bar and through an opening 32 provided in the bar, as shown in FIG. 2. The depth and diameter of cups 32 are such that the coil spring is held and maintained in place without the aid of a fastening pin or bolt extending through the cups and the spring.

As best seen in the end view of device 10, as depicted in FIG. 3, the hubs 19 of the clamp arms 24 and the ends of bar 12 are provided respectively with opposed, mating ledges 34 and 36 which function to abut against each other, and thereby protect spring 30, when excessive forces and movements are encountered by the device 10. Another such pair of mating ledges is preferably provided in each hub 19 and in each end portion of bar 12 at a location substantially diametrically opposed to the above pair 34 and 36, as indicated in FIG. 1 by dash lines 38 and 40.

The operation of device 10 is as follows. The device is first connected to two parallel conductors 17 (in FIGS. 1 and 2) via conductor clamps 14. Thereafter, if one or both of the conductors begins to vibrate or oscillate, the weight of bar 12 is such that the clamp arm 24 clamped to the moving conductor moves relative to the bar. The motion of clamp arm 24 pivots arm portion 26 about pin 18 such that cup 28 of the arm portion is moved to translate the coils of the spring located between the moving cup and bar 12 relative to each other, the relative motion of the coils causing sliding friction between coils. This friction generates heat which is dissipated to the atmosphere and to the metal of the cup, arms and bar to quickly stop the motion of the conductor. The ledges 34, 36 and 38, 40 of the bar and clamp arms are spaced apart to allow the working of the coils of spring 30 yet the spacing is small enough to protect the spring if the relative motion between the bar and clamp arm tends to become excessive, as mentioned earlier.

The above damping function is effected by a device having a minimum of relatively low cost components, the bar and clamp components being easily cast or otherwise made so that the cost of the device is kept at a minimum amount. The bar and clamp components are particularly suitable for casting in a sand mold since the openings in these components extend in the direction in which the components are removed from such a mold, i.e., the mold will have no openings that will permit molten metal to enter in a direction that would prevent removal of the components from the mold.

In addition, the spacer of the invention provides a rate of damping that is directly proportional to the amount of vibration energy to be dissipated. As best seen in FIG. 11 of the drawings, the diameters of pivot pin 18 and openings 15 in hub 19 and bar 12 are such that they provide bearing surfaces which rub against each other when relative movement takes place between the pins and surfaces provided by the openings. Such rubbing action generates heat which is effective to assist in the dissipation of the energy of conductor vibration. In addition, however, as the amount of vibration energy to be dissipated increases, the translation of damping spring 30 in response to the vibration increases. This results in a greater force being imposed upon the pin and the surfaces provided by openings 15. With such greater forces, additional friction is generated between the bearing surfaces of the pin and openings to provide increased heat generation and thus energy dissipation.

Figure 4:
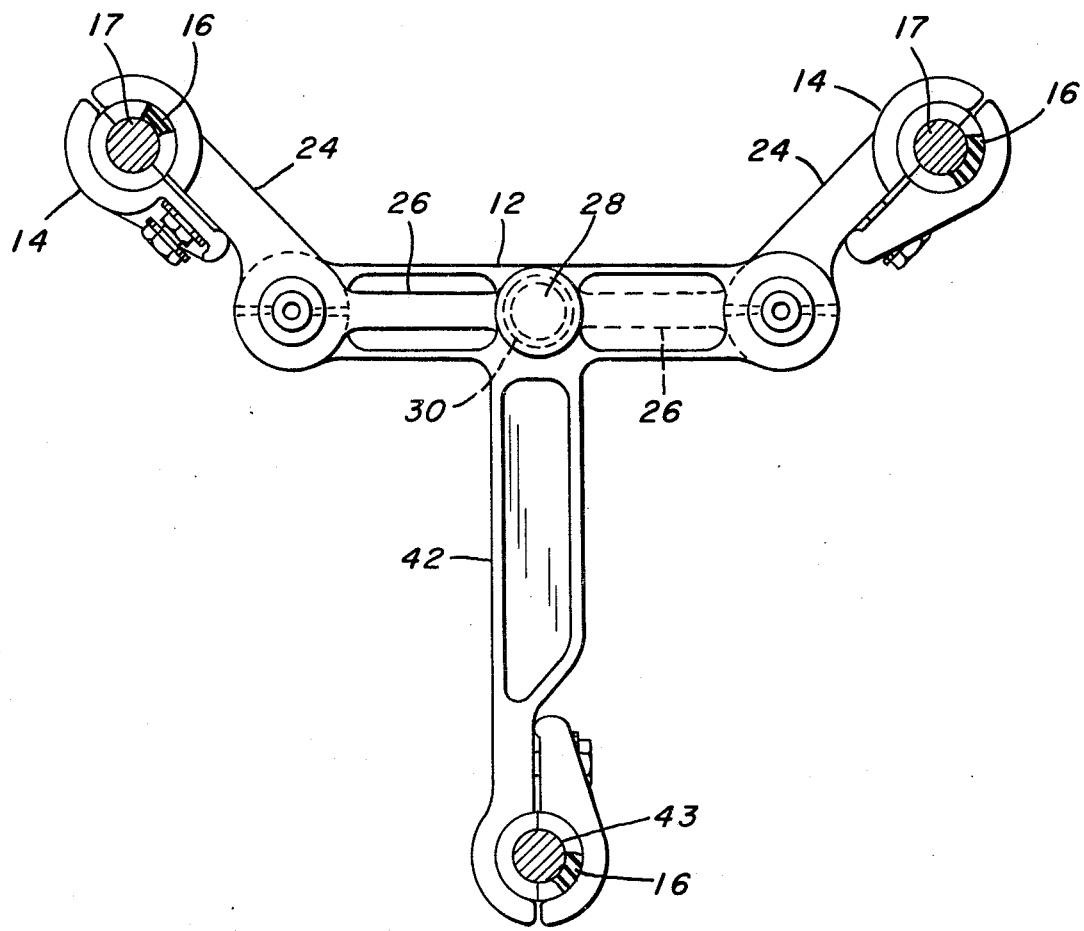
FIG. 4 is a side elevation of the damping spacer of the invention modified for a bundle of three conductors.

FIG. 4 of the drawings shows an embodiment of the invention in which the basic two conductor damper concept thereof is modified to space and dampen a bundle of three conductors. More particularly, the basic spacing bar, conductor clamps, clamp arms and damping spring of the device of FIG. 4 are the same as those described above in connection with FIGS. 1 to 3, with like parts bearing the like reference numerals. The bar 12, however, in FIG. 4, is provided with a downwardly depending or extending rigid arm and clamp 42 adapted to attach the device of a third conductor 43. With aeolian, vertical vibration of conductor 43, bar 12 is vibrated vertically and relatively to clamp arms 24 and 26, this relative movement functioning to slide the coils of damping spring 30 of the device relative to each other. As discussed above, such relative sliding of the coils dissipates the energy of the conductor vibration which stops the vibration. In the case of an oscillating (substantially circular) motion of conductor 43, bar 2 tends to be similarly translated against the inertia of the clamp arms and conductors 17 to cause relative sliding of the coils of spring 30 to effect damping of the oscillating motion.

Figure 5:
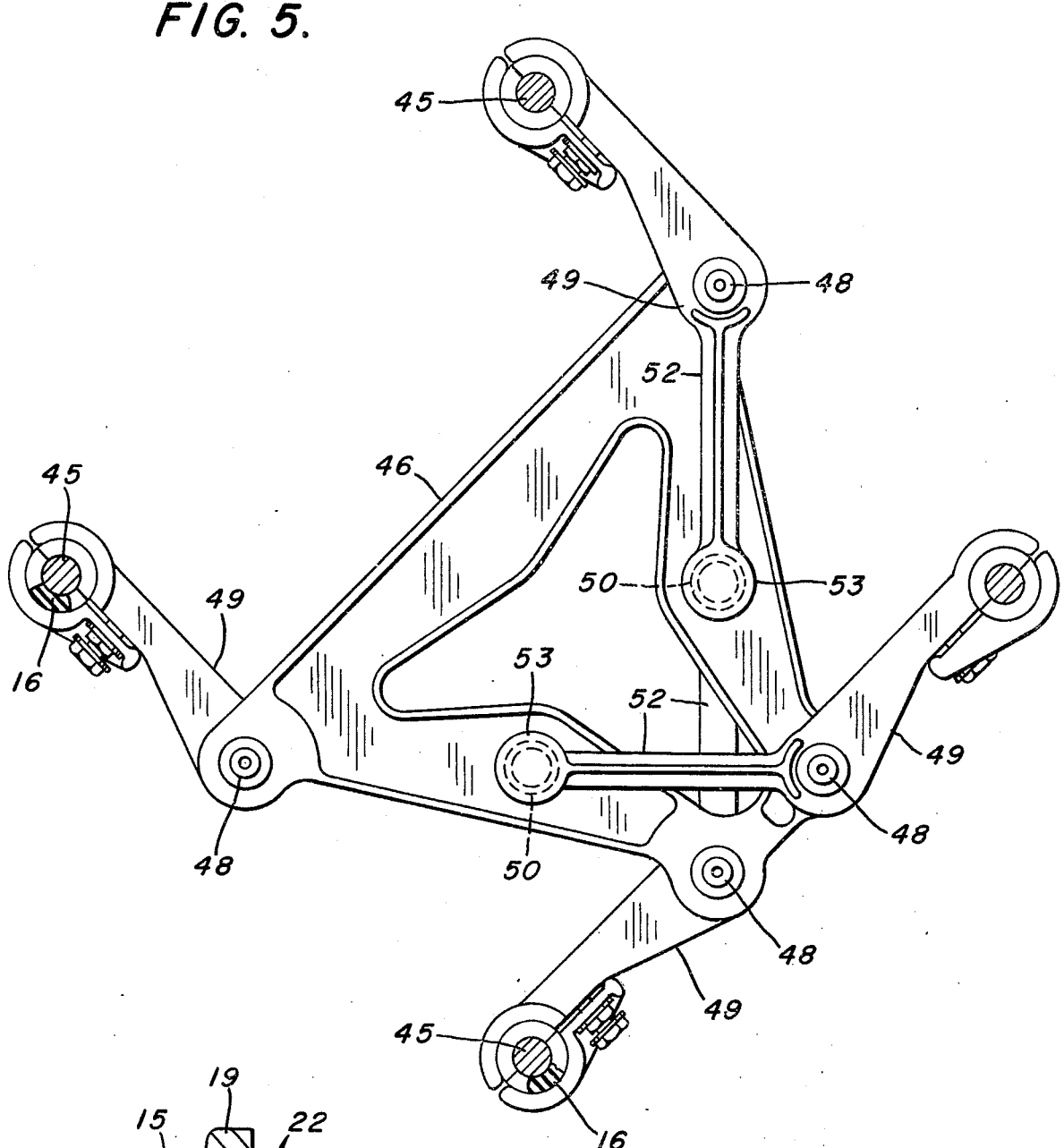
FIG. 5 is a side elevation view of the damping spacer of the invention adapted for a four conductor bundle having a diamond shape (in cross section) configuration.

In FIG. 5 of the drawings, an embodiment of the invention is shown for damping and spacing a diamond configuration of four overhead conductors 45, i.e., a configuration in which two of the four conductors are disposed in substantial vertical alignment and the other two of the four are located in substantial horizontal alignment and laterally displaced from a line extending between the vertical conductors. In FIG. 5, frame 46 is shown having essentially a right triangular configuration, the frame pivotally supporting, via four rigid pins 48, four clamp arm structures 49 located adjacent the corners of the triangle. The structure and configuration of the clamp arms are substantially the same as those described in connection with FIGS. 1 to 3, and their basic cooperation with frame 46 (and two springs 50) is the same, i.e., each of the clamp arms in the structure of FIG. 5 includes an arm portion 52, extending in the general direction of a respective leg of frame 46, and an integral cup 53 located at the end of each arm 52 remote from pin 48 for seating one end of one of the two close coil springs 50 (shown in dash outline in FIG. 5) extending through respective legs of the frame. At the opposite end of each of the coil springs is the cup of an arm portion 52 of a second clamp arm 49 located on the opposed side of frame 46 and extending in a direction generally opposite to the previous clamp arm. (On the left side of the structure depicted in FIG. 5 arm portion 52 of clamp 49 in hidden from view by the lower leg of the frame).

In the embodiment of FIG. 5 of the drawings, only two coil springs are employed to provide damping of four conductors. Similarly, an eight conductor bundle spacer of the invention (not shown) would require only four damping springs. Damping is effected substantially in the manner described above in connection with FIGS. 1 to 3 of the drawings.

As shown in FIG. 5, the damping spacer thereof is compliant in the vertical direction for the two vertically aligned (uppermost and lowermost) conductors by virtue of the fact that the two clamp arms adapted to be clamped to these conductors are offset from their respective pivot pins 48 by an angle that is acute with respect to a horizontal or vertical line of plane extending through the centers of the pins. With vertical movement of either of the vertical clamp arms, the clamp arm pivots about its pin 48, with arm portion 52 thereof being moved to translate cup 53 and the coils of spring 50 located between the translated cup and the associated leg of frame 46.

In a similar manner, oscillating motions of the horizontally spaced, outermost conductors 45 will rotate clamp arms 49 about the pins 48 associated therewith to effect translation of the coils of associated spring 50, though it should be noted that the horizontal clamp arms will move up and down, vertically, to effect damping of such motion, as will the vertical clamp arms function to move with oscillating motions of the vertical conductors to effect damping of such motions.

In place of the triangular frame 46 shown in FIG. 5, a structural cross (not shown) could be employed to space and dampen a four conductor bundle. In such a case, four conductor clamps would be mounted on the four arms, with two damping springs extending through two of the arms, in a manner similar to that shown in FIG. 5.

Figure 6:
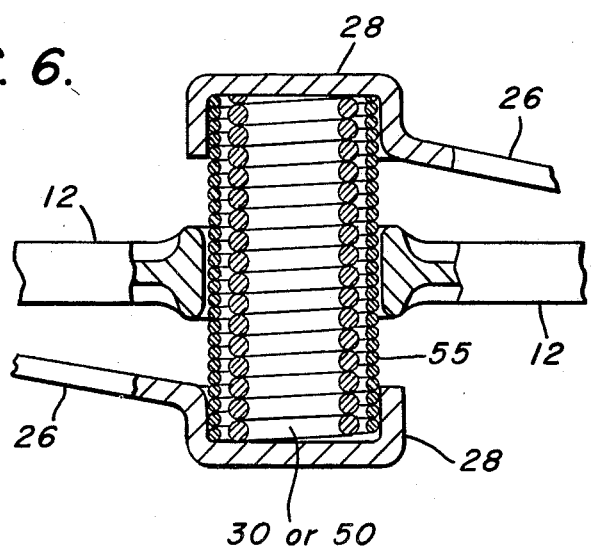
FIG. 6 is a sectional view of a double spring arrangement employable in the above damping spacers of the invention.

In the embodiments of FIGS. 1 to 5, damping of the two conductors associated with the single damping spring (30 or 50) is effected by the single spring, which accounts at least in part for economical advantages of these embodiments. However, it is possible, in a low cost manner, to enhance the damping characteristics of these embodiments by the use of an additional, close coil spring located coextensive with the damping spring of these embodiments. Such an additional spring 55 is shown in the sectional view of FIG. 6 of the drawings. As shown, spring 55 is located on the outside of spring 30 or 50, and has a wire diameter somewhat smaller than that of spring 30, which provides a spring that is "softer" than spring 30 or 50. Further, the inside diameter of spring 55 may be such that clearance is provided between it and the outside diameter of spring 30. The damping range of the spacers is enhanced by spring 55 since it is softer and is thus more responsive to low energy vibration and oscillation motions of a conductor than the stiffer spring 30 or 50. When the energy and force of a conductor motion exceed the capabilities of the outside spring, the lighter spring 55 moves against the heavier, stiffer spring 30 or 50 so that the heavier spring is utilized to effect damping. In addition to the extended range of damping provided by the second spring, such a dual spring arrangement provides the springs with greater fatigue life and provides a solution that utilizes springs of relatively small wire diameters, without the necessity of having to reduce the damping capabilities of the damping spacer.

Figure 7:
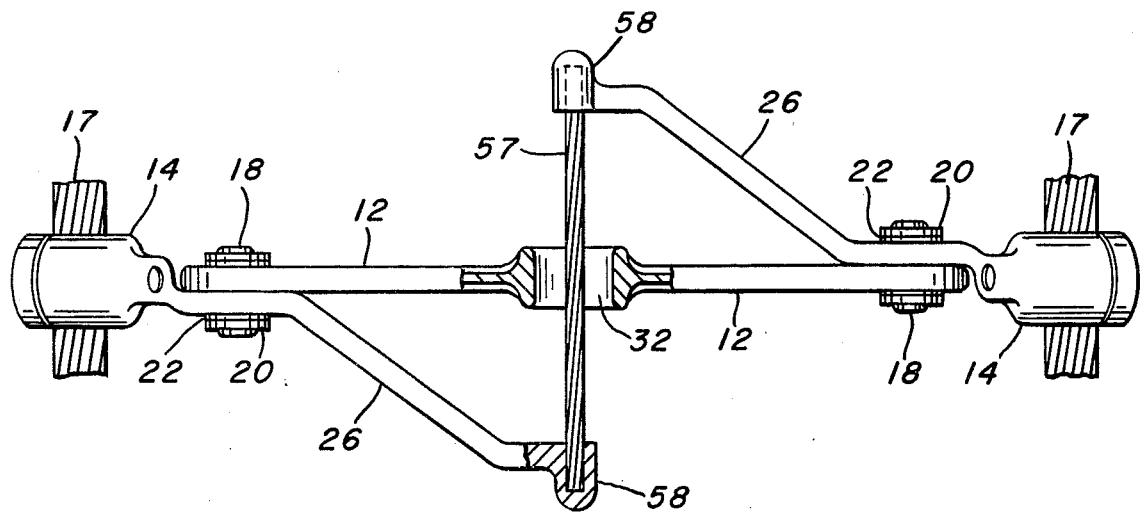
FIG. 7 is a plan view of an embodiment of the invention using a stranded cable as the primary damping mechanism.

In FIG. 7 of the drawings is shown a plan view of a damping spacer utilizing a stranded cable 57 as the basic damping mechanism in place of the close coil spring of the previous embodiments. Otherwise, the structure and operation of the FIG. 7 embodiment are the same as that described above in connection with FIGS. 1 to 3, and like reference numerals are used to designate like parts. The clamp arms in the FIG. 7 embodiment are attached to the opposed ends of cable 57 by integral bosses 58 dimensioned to receive and firmly grip the cable ends so the cable is translated and subject to a certain twisting motion when associated conductors 17 vibrate or oscillate. The translation and twisting of the cable effects sliding friction between the strands of the cable that dissipates the energy of the vibration or oscillation in the form of heat.

In addition, the bar 12 of the embodiment of FIG. 7 has an opening 32 that is substantially larger than the diameter of cable 57 (which extends through 32) so that with a sufficient amount of conductor motion the cable will impact against the bar to provide additional damping.

In FIG. 8 of the drawings, an elastomer damping element 59 is shown taking the place of the damping springs or damping cable 57 of the invention. The elastomer element can be solid, or it may be hollow in order to provide a mechanism more responsive to lower energy vibrations and oscillations. Such an element provides damping by virtue of an inherent hysteresis characteristic that generates heat when the element is physically distorted.

Figure 9:
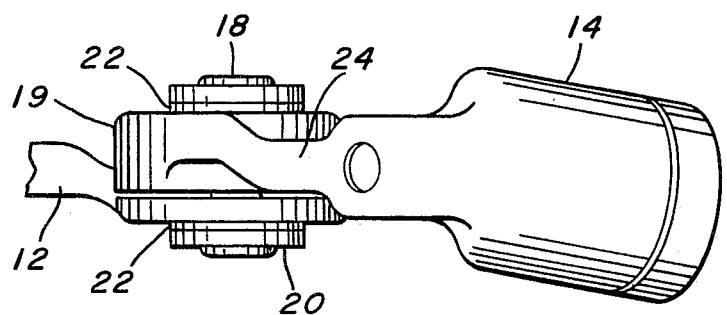
FIG. 9 is a plan view of a conductor clamping member employable in the invention angled slightly from the axis of the arm of the clamping member in plan view.

FIG. 9 of the drawings shows a conductor clamp employable with the spacing devices of the invention and adapted to preload on friction discs 22 by the resilience of the elastomer bushings 16 shown in FIGS. 1, 4 and 5. This is accomplished by casting or otherwise forming conductor clamp 14 in such a manner that it extends at a slight angle (in plan view) with respect to the longitudinal axes of the clamp arm 24 and bar 12. Such an angle might be 10°, for example. When the damping spacer of the invention is disposed perpendicularly between two (or more) overhead conductors and firmly attached thereto by clamps 14, the bushings 16 located in the clamps will engage the conductors in a manner that endeavors to straighten or align the clamps with the axis of the bar. The clamps, however, being unable to "straighten" themselves place a force on their respective washers 20 and 22, by angling the arm 24 and hub 19 of the clamp arms, with respect to the bar, against the washers. This preloads the washers, particularly friction washers 22, such that a predetermined amount of friction is provided between the friction washers and the sides of the hub 19 of the clamp arms for assisting the damping function of the present spacer when associated overhead conductors vibrate or oscillate.

Figure 10:
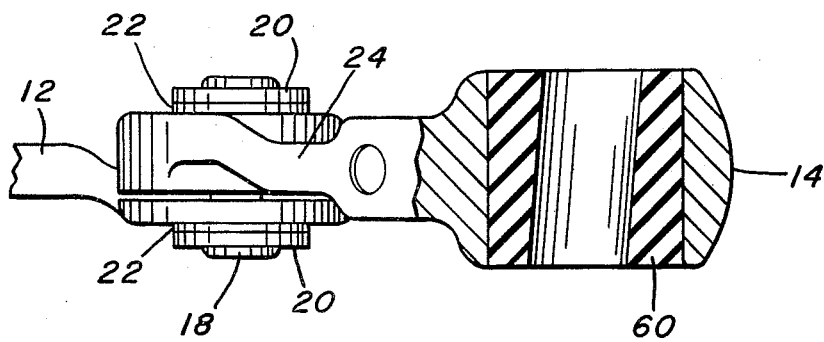
FIG. 10 is a longitudinal sectional view of a conductor clamp and bushing employable in the invention.

A similar function and result can be obtained by the use of tapered bushings 60, as shown in FIG. 10. Again, the bushing and associated conductor 17 will engage each other in a manner that attempts to straighten the bushing on the conductor thereby angling the hub of the clamp against the washers to preload particularly friction washers 22.

In FIG. 11 of the drawings there is shown a wave washer 62 located between two metal washers 20 and 20A for the purpose of (again) providing a preload on friction discs 22, the wave washer having a resilient characteristic that provides the preload. The wave washer, however, functions also as a means to index or align the clamp arms in perpendicular relationship to the overhead conductors. The surfaces of bar 12 and hub 19 (of each clamp arm 24, 26) that face each other (see FIGS. 3 and 11) are planar, parallel surfaces. These surfaces are forced toward each other by the resilience of wave washers 62 (one at each hub) to maintain the bar and the clamp arms in alignment. In installing the damper of the invention, the lineman attaches one clamp to one conductor but before the second clamp is attached to the second conductor, the workman allows the device 10 to seek a neutral position, which position will be perpendicular to the axes of the conductors. He then proceeds to attach the second clamp to the second conductor, the second wave washer 62 maintaining the aligned position of the second clamp arm.

As shown in FIGS. 1, 2, 4, 5 and 7, the arm portions of the conductor clamps are of equal length, with damping spring 30 and 50 being located at the respective centers of bar 12 and the legs of frame 46 (FIG. 5). In addition, spring 30 is shown in FIG. 1 as being centered in the plane of bar 12. However, if different conductors of a conductor bundle have different vibration and/or oscillating characteristics so that the damping spacer is required to provide appropriate, different damping capabilities within the bundle, the arms of the conductor clamps of any single damper spacer of the invention can be made to have different lengths, and the extent of the spring on the opposed sides of the bar may be different. If, for example, the distance $x$ between the center line of the left hand conductor, 17, in FIG. 1 and the center line of spring 30 is less than the distance $y$ between spring 30 and the right hand conductor in FIG. 1, then the left hand clamp arm will have a mechanical advantage smaller than the right hand clamp arm such that the energy of vibration of the left hand conductor capable of translating spring 30 will be greater than that required by the right hand conductor to translate spring 30.

Similarly, if the distance $a$ of the portion of spring 30 extending on one side of bar 12 is less than the $b$ portion of the spring on the other side of the bar, then a phenomenon similar to that described above in connection with the longer clamp arm will occur, i.e., the $a$ portion of the spring 30 will be "harder" than the $b$ portion such that energies of vibration of the left hand conductor that will be damped by the spring are higher than the energies of vibration of the right hand conductor that will be damped by the spring.

Such an arrangement, as just described, is particularly useful in bundles in which a horizontally aligned conductor received the wind generally from one direction, such that the windward conductor will tend to vibrate at greater amplitudes than the leeward conductor. In such a case, the windward conductor will require the greater damping efficiency.

If bar 12 of damping spacer 10 is not of a weight sufficient to effect relative movement between the bar and clamp arm when an associated overhead conductor vibrates, weights can be easily attached to the bar, or, as discussed earlier, a suitable mass 64 (FIG. 1) may be attached to one end of the bar to stabilize the conductor closest to the mass so that the other conductor can cause translation of the damping mechanism.

While the invention has been described in terms of preferred embodiments, the claims appended hereto are intended to encompass all embodiments which fall within the spirit of the invention.

Having thus described my invention and certain embodiments thereof, I claim:

1. A damping spacer comprising a body member, at least two clamping members, rigid pivot means respectively pivotally attaching said clamping members to the body member at spaced apart locations thereon and on opposed sides thereof, and resilient damping means extending through the body member and resiliently connecting the clamping members to each other.

2. The damping spacer of claim 1 in which the damping means is a close coil, helical spring.

3. The damping spacer of claim 1 in which the damping means is stranded cable.

4. The damping spacer of claim 3 in which the stranded cable extends through an opening provided in the body member, the diameter of said opening being substantially larger than the diameter of the cable.

5. The damping spacer of claim 1 in which the damping means is an elastomer structure.

6. The damping spacer of claim 1 in which the body member is a cast metal structure having openings extending perpendicularly therethrough and in the direction in which the structure is removed from a casting mold.

7. The damping spacer of claim 1 including washers made of a heat resistant, friction generating material located between the body and clamping members at the location of the pivot means.

8. The damping spacer of claim 7 including resilient means mechanically associated with the pivot means providing a predetermined frictional load on the washers and 90° alignment with the conductors of a conductor bundle when installed in said bundle.

9. The damping spacer of claim 1 in which the pivot means are rigid pins extending through the body and clamping members, said rigid pins being effective to protect the damping means from articulation stresses.

10. The damping spacer of claim 9 in which relative motion between the body member and the surfaces of the rigid pins is effective to provide damping at a varying damping rate, the rate of damping being directly proportional to the amount of vibration energy to be damped.

11. The damping spacer of claim 1 in which the clamping members include two arm portions joining each at the vertex of a predetermined angle, the clamping members being pivotally attached to the body member adjacent the location of the vertex of the angle of the arm portions.

12. The damping spacer of claim 1 in which each of the clamping members comprises clamp halves held together by bolt means, the heads of said bolt means being visible from ground level when the damping spacer is installed in a conductor bundle.

13. The damping spacer of claim 1 in which the clamping members have different length dimensions such that one clamping member has an effective lever arm and mechanical advantage different from that of the other clamping member.

14. The damping spacer of claim 1 in which the damping means extends through the member, with the length dimension of the damping means on one side of the body member being different from that on the other side of the body member.

15. The damping spacer of claim 1 in which the body member extends longitudinally between the pivot means, and an arm and clamp structure extends from the body member in a direction substantially perpendicular to the longitudinal axis of the body member.

16. The damping spacer of claim 1 in which the body member is adapted to have weights attached thereto to provide additional mass for the body member.

17. A damping spacer having a body member, a plurality of conductor clamping members and pivot means respectively pivotally attaching the clamping members to said body member at respective spaced locations thereon, with at least two of the clamping members having respective arm portions located opposite each other, and resilient damping means resiliently connecting the respective opposite arm portions together, the damping means having a longitudinal axis extending through the body member.

* * * * *